US012796584B2

(12) United States Patent
Lim

(10) Patent No.: US 12,796,584 B2
(45) Date of Patent: Nov. 17, 2026

(54) SPATIAL INFORMATION SENSOR APPARATUS BASED ON ISOBUS AND THE CONTROL METHOD THEREOF AND AUTONOMOUS AGRICULTURE EQUIPMENT

(71) Applicant: ELECTRONICS AND TELECOMMUNICATIONS RESEARCH INSTITUTE, Daejeon (KR)

(72) Inventor: Eul Gyoon Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 12 days.

(21) Appl. No.: 19/045,754

(22) Filed: Feb. 5, 2025

(65) Prior Publication Data

US 2025/0261576 A1 Aug. 21, 2025

(30) Foreign Application Priority Data

Feb. 20, 2024 (KR) ........................ 10-2024-0024103

(51) Int. Cl.
*B60R 16/02* (2006.01)
*A01B 69/04* (2006.01)
*B60R 16/023* (2006.01)

(52) U.S. Cl.
CPC ........ *A01B 69/008* (2013.01); *B60R 16/0231* (2013.01)

(58) Field of Classification Search
None
See application file for complete search history.

(56) References Cited

U.S. PATENT DOCUMENTS

2015/0142834 A1 5/2015 Lee et al.
2020/0167703 A1 5/2020 Tatge et al.
(Continued)

FOREIGN PATENT DOCUMENTS

CN 108650063 A 10/2018
GB 202318255 A * 11/2023 ........... A01B 69/001
(Continued)

OTHER PUBLICATIONS

Seung-Kuk Roh et al., "A Proposal of Implementation of Virtual Terminal Based on ISO 11783", Proceedings of the Korean Institute of Electronics Engineers Conference, Korea Nov. 25, 2016.
(Continued)

*Primary Examiner* — Adam D Tissot
(74) *Attorney, Agent, or Firm* — LRK PATENT LAW FIRM

(57) ABSTRACT

An ISOBUS-based spatial information sensor apparatus according to one embodiment disclosed in this document includes: a sensor capable of detecting distances to surrounding objects within an effective measurement range; a communication module supporting communication with a virtual terminal via a specified interface; a memory storing an object pool defining objects (output polygon objects) to be displayed on the virtual terminal; and a processor. The processor is configured to receive sensing data about the effective measurement range from the sensor, calculate polygon vertices from the sensing data based on the object pool, and transmit data related to a polygon object corresponding to the calculated vertices to the virtual terminal via the communication module.

20 Claims, 14 Drawing Sheets

(56) References Cited

U.S. PATENT DOCUMENTS

| | | | | |
|---|---|---|---|---|
| 2023/0115290 | A1 | 4/2023 | Ogawa | |
| 2023/0314282 | A1 | 10/2023 | Lee et al. | |
| 2025/0174028 | A1 * | 5/2025 | Christiansen .......... | G06V 10/80 |

FOREIGN PATENT DOCUMENTS

| | | | |
|---|---|---|---|
| KR | 10-1902270 | B1 | 9/2018 |
| KR | 10-2022-0001405 | A | 1/2022 |

OTHER PUBLICATIONS

Enkhbaatar Tumenjargal, "Embedded Hardware and Software Implementation of a Virtual Terminal Based on the ISO 11783 Standard", PhD Dissertation, Chonbuk National University, Aug. 22, 2013.

* cited by examiner

SPATIAL INFORMATION SENSOR APPARATUS BASED ON ISOBUS AND THE CONTROL METHOD THEREOF AND AUTONOMOUS AGRICULTURE EQUIPMENT

CROSS-REFERENCE TO RELATED APPLICATION(S)

This application claims priority to and the benefit under 35 USC § 119 of Korean Patent Application No. 10-2024-0024103, filed on Feb. 20, 2024, in the Korean Intellectual Property Office, the entire disclosures of which are incorporated herein by reference for all purposes.

BACKGROUND OF THE INVENTION

1. Technical Field

The present document discloses various embodiments related to autonomous driving technology for tractors.

2. Description of Related Art

The ISO 11783 standard defines protocols for agricultural tractors and implements that may be attached or detached. ISOBUS refers to ISO 11783 standard or the implement bus (currently standardized at 250 kbit/s CAN) based on the standard.

The ISO 11783 standard extends the SAE-J1939 standard, which governs the transmission of control messages for internal engines and transmissions of heavy-duty vehicles. The ISO 11783 standard is characterized by the following features: 1) unique graphical user interfaces (GUIs) or screen definitions (ISOBUS Object Pool) are transmitted from the implement ECU to a terminal (ISOBUS Universal Terminal, ISOBUS Virtual Terminal) in the tractor's cabin, and 2) operational events initiated via user/auxiliary input devices (e.g., joystick) are sent from the tractor cabin to the implement ECU to operate or set the implement.

The Protocol Data Unit (PDU) of ISO 11783 and SAE-J1939 corresponds to one or more Classical CAN data frames defined in the CEFF (classical extended frame format) under ISO 11898-1. Specifically, the CEFF message uses a 29-bit ID field for real-time arbitration and transmits up to 8 bytes of data.

In contrast, ISO 11783 and SAE-J1939 divide the 29-bit ID field into priority (3 bits), code page (2 bits), PDU format (PF, 8 bits), PDU Specific (PS, 8 bits), and Source Address (SA, 8 bits). The PS field, depending on the PF value, serves as the Destination Address (DA), Group Extension (GE), or a manufacturer proprietary value. And, the 24-bit PGN (Parameter Group Number), which includes the code page (2 bits), PF (8 bits), and PS (8 bits), is used to identify the Parameter Group associated with CAN data frames. The Parameter Group and PGN are predefined in the SAE-J1939 DA, which is registered and managed by the SAE J1939 committee. Common components and sensors used in heavy-duty vehicles, such as trucks, buses, tractors, implements, and ships, are standardized under SAE-J1939 DA.

SUMMARY

Regarding the autonomous driving of tractors, the ISO 11783 standard includes technology that allows the ISOBUS Task Controller to autonomously divide field data received from the Farm Management Information System (FMIS) and set driving routes. Also, the ISO 11783 standard includes technology that the implement ECU controls the tractor's speed and direction. However, tractors based on the ISO 11783 standard may only provide limited autonomous driving capabilities. This is because ISO 11783 standard defines only GPS or DGPS data related to the tractor's current position as the sensor-related PGNs. Consequently, autonomous driving under the ISO 11783 standard is confined to pre-planned routes and real-time position data. Additionally, sensing data for obstacle detection or determining drivable paths using range sensors, such as lidar or depth cameras, is not defined within the ISO 11783 standard. While manufacturer proprietary messages can be used to transmit such data via the ISOBUS implement bus, these messages are recommended to occupy no more than 2% of the CAN bus traffic, imposing constraints on data transmission volumes The various embodiments disclosed in this document provide an ISOBUS-based spatial information sensor apparatus and a control method capable of configuring the tractor's sensor data in the form of spatial information.

An ISOBUS-based spatial information sensor apparatus, includes: a sensor capable of detecting distances to surrounding objects within an effective measurement range; a communication module supporting communication with a virtual terminal via a specified interface; a memory storing an object pool defining output polygon objects to be displayed on the virtual terminal; and a processor, wherein the processor: receives sensing data regarding the effective measurement range from the sensor, calculates polygon vertices from sensing data based on an object pool, and transmits data related to the polygon object corresponding to calculated vertices to the virtual terminal via the communication module.

A method of controlling an ISOBUS-based spatial information sensor apparatus according to one embodiment disclosed herein includes: receiving sensing data from a sensor regarding an effective measurement range; calculating polygon vertices from the sensing data based on an object pool defining output polygon objects for display on a virtual terminal; and transmitting data related to the calculated polygon object to the virtual terminal via a specified interface.

Agricultural equipment according to one embodiment disclosed herein includes: a virtual terminal; and a spatial information sensor connected to the virtual terminal via an ISOBUS interface. The spatial information sensor includes a sensor capable of detecting an effective measurement range, a memory storing an object pool defining output polygon objects for display on the virtual terminal, and a processor. The processor may receive sensing data (sensor topics) from the sensor regarding the effective measurement range, calculates polygon vertices from the sensing data based on the object pool, and transmits data related to the calculated polygon object to the virtual terminal via the interface.

According to various embodiments disclosed in this document, the sensor data of a tractor may be configured into spatial information. Additionally, various effects that may be directly or indirectly identified through this document are provided.

BRIEF DESCRIPTION OF THE DRAWINGS

In connection with the description of the drawings, identical or similar reference numerals can be used for identical or similar components.

DETAILED DESCRIPTION

Figure 1:
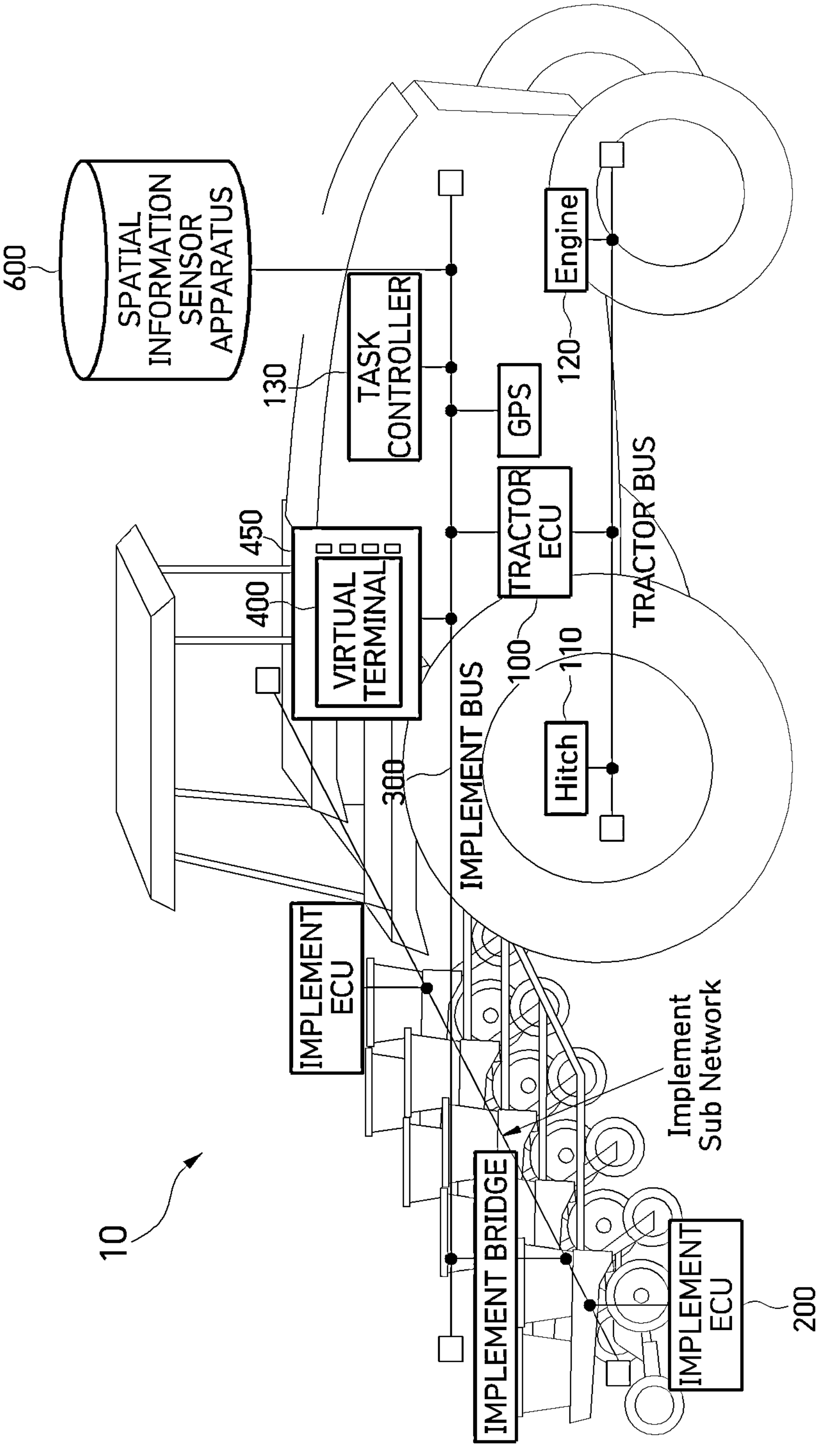
FIG. 1 illustrates the overall configuration of an ISOBUS-based tractor according to one embodiment.
Figure 2:
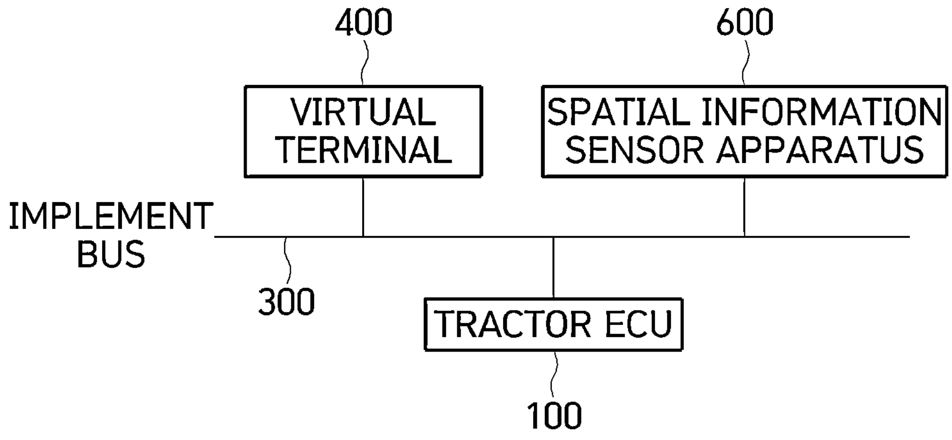
FIGS. 2 through 5 illustrate various connection configurations of the main components comprising the spatial information sensor apparatus and the ISOBUS-based tractor according to one embodiment.

FIG. 1 illustrates the overall configuration of an ISOBUS-based tractor according to one embodiment, and FIGS. 2 through 5 illustrate various connection configurations of the spatial information sensor apparatus with an ISOBUS-based tractor according to one embodiment.

Referring to FIG. 1, an ISOBUS-based tractor (10) according to one embodiment may include a driving unit (e.g., 110, 120), a tractor ECU (100), a virtual terminal (400), and a spatial information sensor apparatus (600).

Components such as the engine, brakes, PTO (power take-off), three-point hitch, and lights (e.g., headlights, brake lights, and turn signals) that are connected to the tractor bus and constitute the driving unit (e.g., 110, 120) may, for example, be SAE J1939-based devices.

The tractor ECU 100 may control the driving unit (e.g., 110, 120) to perform tractor operations (e.g., starting, accelerating, decelerating, stopping, turning lights on/off, autonomous driving). The tractor ECU 100 may also control implement brake devices or implement light devices connected to the implement bus 300 in accordance with the ISO 11783 standard.

The virtual terminal (400), provided as a central control panel in the tractor cabin, may be an ISOBUS virtual terminal for monitoring and controlling various functions of ISOBUS implements. The virtual terminal (400) may include a display capable of outputting polygon objects. The virtual terminal 400 may be configured as a touchscreen capable of detecting or receiving user inputs. Additionally, or alternatively, the virtual terminal (400) may detect/receive user input via an auxiliary input device (450) (e.g., joystick). The virtual terminal (400) may transmit user input event (e.g., joystick input) regarding the virtual terminal 400's screen to the ISOBUS-based tractor ECU (100) or the ISOBUS-based implement ECU 200. The tractor ECU (100) or implement ECU (200) may respond to the received events by modifying the operation/settings of the tractor or implement.

The driving unit (e.g., 110, 120), tractor ECU (100), and virtual terminal (400) may exchange data each another via the implement bus 300 in accordance with the ISO 11783 standard. The implement bus 300, based on ISO 11783, may be an ISOBUS, which, under the current ISO 11783 standard, is a CAN (controller area network) bus with a bandwidth of 250 kbps.

The tractor (10) may be coupled with at least one implement, which is attachable/detachable machinery, to support various agricultural and forestry operations.

The implement ECU (200) may perform a specified operation for the implement and control the implement by communicating with the tractor ECU (100). The implement ECU (200) may output its dedicated screen via the virtual terminal (400). For example, to display the dedicated screen, the implement ECU (200) may send the implement's dedicated GUI (Graphic User Interface) screen or screen definition (ISOBUS Object Pool) to the virtual terminal (400). In this context, the virtual terminal (400) may transmit user input events (e.g., joystick inputs) related to the screen of the virtual terminal (400) to the implement ECU (200). When the implement ECU (200) receives an event from the virtual terminal (400), it may modify the operation or settings of the implement in response to the event.

Referring to FIGS. 2 through 5, an ISOBUS-based tractor (10) according to one embodiment may include a spatial information sensor apparatus (600). The spatial information sensor apparatus (600) may communicate with various ISOBUS ECUs, including the virtual terminal (400), via the implement bus (300) in accordance with the ISO 11783 standard. FIGS. 2 through 5 primarily describe the operations of other components (e.g., 100, 400) based on the sensing data by the spatial information sensor apparatus (600).

According to one embodiment, the spatial information sensor apparatus (600) (or spatial information sensor) may detect distance values (2D or 3D information) to surrounding objects within an effective measurement range. The effective measurement range may refer to the spatial area can be measured by the sensor within the spatial information sensor apparatus (600). For example, the effective measurement range may have an arc shape over a predetermined azimuth angle (e.g., all directions or a specified forward azimuth) centered on the spatial information sensor.

According to one embodiment, the spatial information sensor apparatus (600) may calculate output polygon object related to sensing data. The spatial information sensor apparatus (600) may transmit data related to the calculated object (hereinafter, refer to as 'polygon object') to the virtual terminal (400) via the implement bus (300). In this case, the virtual terminal (400) may receive the data related to the polygon object via the implement bus (300) and display the polygon object corresponding to the received data on its screen.

According to one embodiment, the virtual terminal (400) may receive an object pool from the spatial information sensor apparatus (600) and display the received object pool on the screen (display). The virtual terminal (400) may transmit user (e.g., the tractor operator) input (e.g., screen operation events and auxiliary input device operation events) to the tractor ECU (100), implement ECU (200), and spatial information sensor apparatus (600). The user input may include at least one of the following: selection of autonomous/manual driving mode, operation of the spatial information sensor apparatus (600), or selection of debugging mode. In one embodiment, if the virtual terminal (400) receives an object pool modification message from the spatial information sensor apparatus (600), it may modify the polygon object displayed on the screen in response to the object pool modification message.

According to one embodiment, the tractor ECU (100), implement ECU (200), or task controller (130) may designate area within the sensing region (polygon objects) that are not intruded upon by surrounding object (obstacles) as safe zones. The tractor ECU (100), implement ECU (200), or task controller (130) may autonomously drive the tractor within the safe zone by controlling the tractor's engine, brakes, PTO (power take-off), three-point hitch, and lights (e.g., headlights, brake lights, and turn signals). Additionally, when the autonomous driving function is selected via the virtual terminal (400), the tractor ECU (100), implement ECU (200), or task controller (130) (ISOBUS task controller) may request the spatial information sensor apparatus (600) to transmit information necessary to interpret the sensing data (e.g., the central pixel coordinates of the polygon and the scale ratio) in a format such as an ISO 11783 manufacturer-specific message. Also, the tractor ECU (100), implement ECU (200), or task controller (130) (ISOBUS task controller) may interpret sensing messages being in the form of polygon pixel coordinates sent from the spatial information sensor apparatus (600) to address of the virtual terminal (400). Using this information, they may translate sensing messages into physical regions and use it to set autonomous driving route and perform driving operations. The ISOBUS task controller (130) may define driving route in advance based on the standard and operate the tractor and implement by performing GPS-based driving along the route. Furthermore, the ISOBUS task controller (130) may store data, such as soil sensor values or operation results (e.g., fertilizer application amounts) sent from the implement, along with position information in a file.

Figure 3:
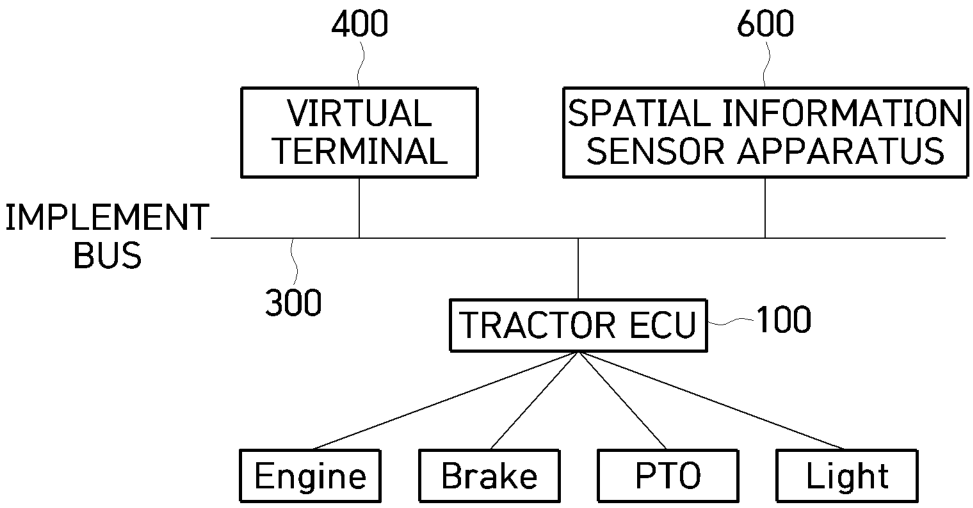

Referring to FIG. 3, the tractor ECU (100) may be directly connected to the tractor's engine, brakes, PTO (power take-off), three-point hitch, and lights (e.g., headlights, brake lights, and turn signals).

Figure 4:
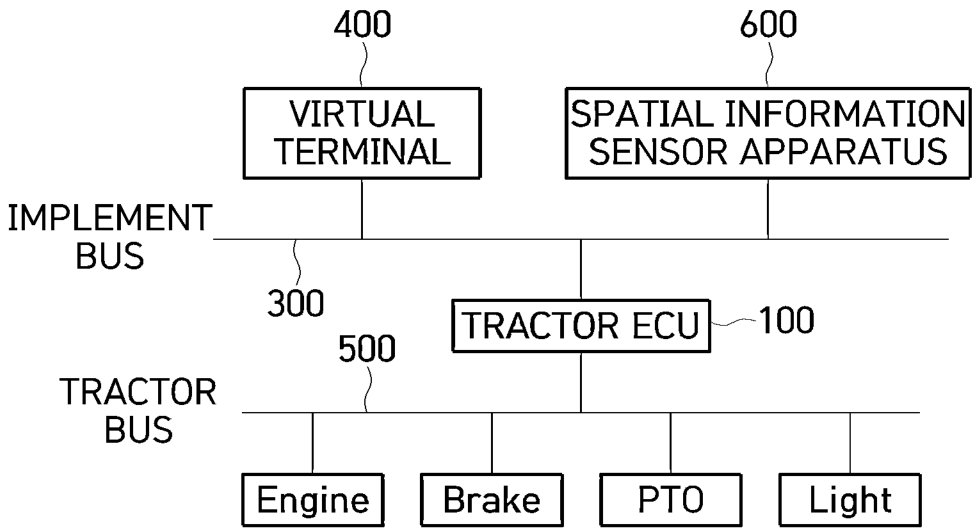
Figure 5:
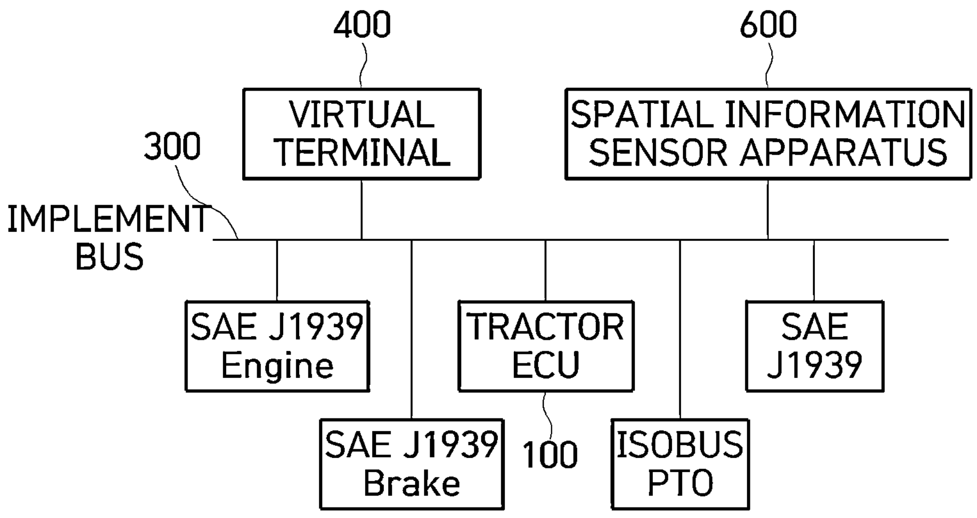

Alternatively, as shown in FIGS. 4 and 5, the tractor ECU (100) may be connected to SAE J1939-based devices via the tractor bus (500) or the implement bus (300). For example, as shown in FIG. 4, the tractor ECU (100) may be equipped with a separate communication module and connect to SAE J1939-based devices interconnected via the tractor bus (500) using the communication module. In this case, the tractor ECU (100) may function as a gateway between SAE J1939 and ISOBUS. As another example, as shown in FIG. 5, the tractor ECU (100) may also connect to SAE J1939-based devices via the implement bus (300).

As described above, the tractor (10) according to one embodiment is connected to the spatial information sensor apparatus 600 via the implement bus (300). By acquiring and utilizing 2D/3D spatial information, the tractor 10 evolves from simply following pre-configured driving route based on current position information to supporting three-dimensional autonomous driving based on 2D/3D spatial information provided by the spatial information sensor apparatus (600).

Additionally, the operator of the tractor (10) according to one embodiment may check the safe zone determined by the tractor ECU (100) on the display and compare it with their direct assessment of the actual environment. This allows the operator to recognize potential hazardous situations and respond quickly, such as by terminating autonomous driving.

Figure 6:
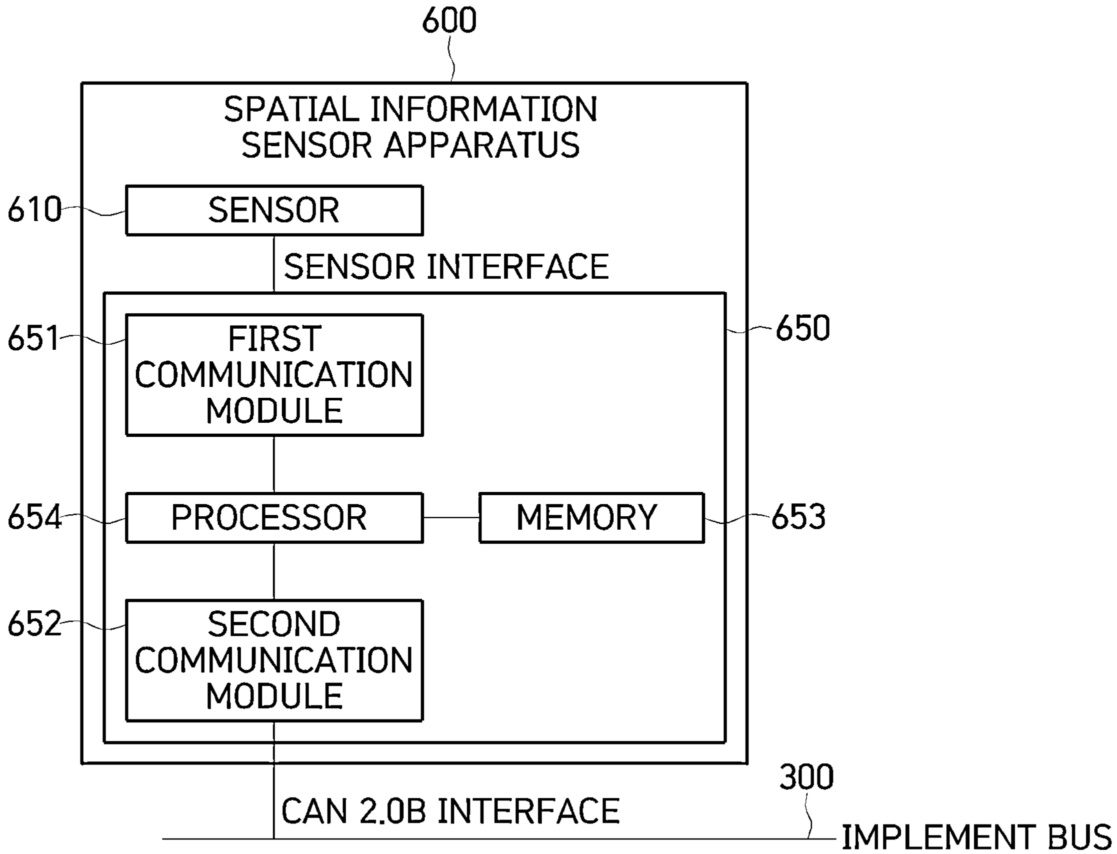
FIG. 6 illustrates the configuration of a spatial information sensor apparatus according to one embodiment.
Figure 7:
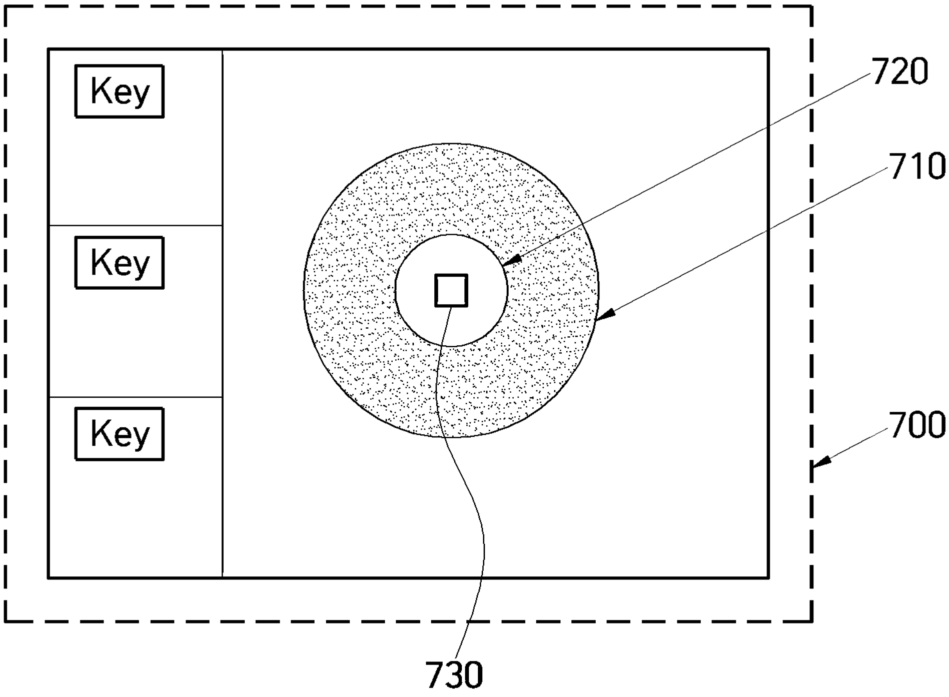
FIGS. 7 and 8 illustrate examples of object pools according to one embodiment.
Figure 8:
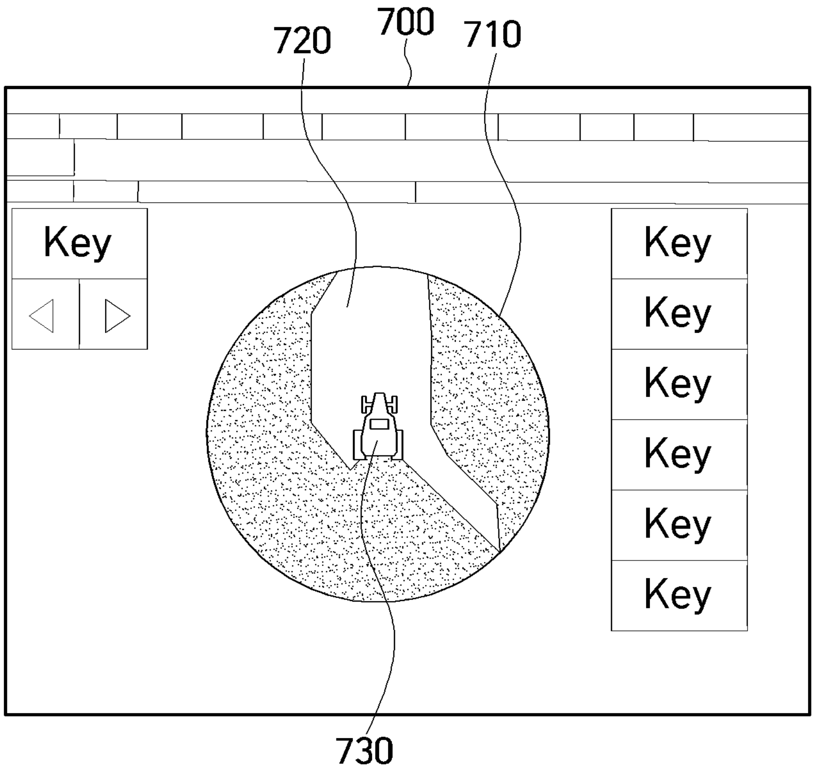

FIG. 6 illustrates the configuration of the spatial information sensor apparatus according to one embodiment, and FIGS. 7 and 8 illustrate examples of object pool according to one embodiment.

Referring to FIG. 6, the spatial information sensor apparatus (600) according to one embodiment may include a sensor (610) and an ISOBUS-based ECU (650). The spatial information sensor apparatus (600) according to one embodiment may have some components omitted or include additional components. Additionally, some components of the spatial information sensor apparatus (600) may be combined into a single unit while maintaining the same functionalities as the respective components before the combination.

In one embodiment, the sensor (610) and the ISOBUS-based ECU (650) may be connected via a first communication channel (referred to as a "sensor network"), such as USB, Ethernet, UART, or RS-485.

The sensor (610) is configured to detect the effective measurement range and measure distance value to surrounding object within the effective measurement range. For example, the sensor (610) may include at least one of a 2D laser scanner, a 3D lidar, or a depth camera. The sensor (610) may transmit sensing data, which includes an array of multiple distance values, via the sensor network (first communication channel).

According to one embodiment, the ECU (650) may operate as one of the ISOBUS-based implement ECUs. The ECU (650) may include a first communication module (651), a second communication module (652), a memory (653), and a processor (654).

The first communication module (651) may support the establishment of the first communication channel (sensor network) between the ECU (650) and the sensor (610) and enable communication through the established channel. The communication channel may be, for example, USB, Ethernet, UART, or RS-485.

The second communication module (652) may support the establishment of a second communication channel (communication channel with the implement bus (300)) and enable communication through the established second communication channel. The implement bus (300) may include, for example, a CAN 2.0B interface with a speed (bandwidth) of 250 kbps.

The memory (653) may include various types of volatile or non-volatile memory. For example, the memory (653) may include ROM (read-only memory) and RAM (random access memory). In one embodiment, the memory (653) may be located inside or outside the processor (654) and may be connected to the processor (654) through various known means. The memory (653) may store various data used by at least one component of the spatial information sensor apparatus (600), such as the processor (654). The data may include, for example, input or output data related to software and associated instructions. For instance, the memory (653) may store at least one instruction for providing a service to output spatial information (sensing data) to the virtual terminal (400).

According to one embodiment, the memory (653) may store an object pool that defines at least one output object (Output Polygon object). The object pool may, for example, be hard-coded into the execution program of the spatial information sensor apparatus (600) within the memory (653) or stored as compiled executable code, configuration files, or binary file formats (e.g., *.iop file extension format) in the memory (653). In one embodiment, the object pool (700) may define objects to be displayed on the virtual terminal (400) in relation to the spatial information sensor apparatus (600). The object pool (700) may include characteristic values of each polygon object, such as a unique object ID, width, height, and the number of vertices (hereinafter referred to as "the first specified number").

Referring to FIGS. 7 and 8, for example, the object pool (700) may include a background object (710), a reference object (730), and a polygon object (720) (ISOBUS output polygon object type 0 or type 1). The background object (710) may represent the effective measurement range (sensor range) of the sensor (610). For instance, the background object (710) may be configured as a circle centered at the position of the sensor (610). The reference object (730) may represent the tractor equipment equipped with the spatial information sensor apparatus (600). For example, the reference object (730) may be an icon in the shape of a tractor.

The polygon object (720) may represent pixel coordinate values obtained by applying a predetermined scale ratio to the distance values detected by the sensor (610). For example, the polygon object (720) may be a polygon composed of pixel coordinates derived by applying a predetermined scale ratio to the distance values of surrounding object detected in all directions by the sensor (610). If there is no surrounding object around the sensor (610), the polygon object (720) may be configured as a circular shape corresponding to the size of the background object (710). If the sensor (610) detects surrounding object encircling the tractor within the effective measurement range, the polygon object (720) may be configured as a smaller circular shape with a reduced diameter corresponding to the shorter distance values, as shown in FIG. 7. If the sensor (610) detects surrounding object in some directions within the effective measurement range of the tractor, the polygon object (720) may be configured as a distorted polygon shape, shortened in the direction of the detected object, as shown in FIG. 8.

The processor (654) may control at least one other component (e.g., hardware or software components) of the spatial information sensor apparatus (600) and perform various data processing or computational operations. For example, the processor (654) may include at least one of a central processing unit (CPU), a graphics processing unit (GPU), a microprocessor, an application processor, an application-specific integrated circuit (ASIC), or a field-programmable gate array (FPGA). Additionally, the processor (654) may have multiple cores.

According to one embodiment, the processor (654) may compress sensing data received via the sensor interface through the first communication module (651) and convert the compressed data into ISOBUS-compliant data (e.g., CAN 2.0 data packets). The processor (654) may transmit the converted ISOBUS-compliant data (e.g., data related to polygon objects) to the virtual terminal (400) via the implement bus (300). For instance, when the processor (654) receives sensing data (e.g., sensor topics) regarding the effective measurement range from the sensor (610) via the first communication module (651), it may calculate polygon vertices related to the sensing data based on the object pool. The processor (654) may transmit the data related to the polygon object, including the calculated vertices, to the virtual terminal (400) connected via the implement bus (300) through the second communication module (652).

According to one embodiment, the processor (654) may receive sensing data (e.g., sensor topics) for the effective measurement range from the sensor (610) connected via the sensor interface through the first communication module (651). The sensing data may be generated by the sensor (610) based on distance measurements to surrounding object within a specified azimuth angle range (e.g., 360 degrees in all directions) within the effective measurement range. The sensing data may include an array of multiple distance values (ranges) to the surrounding object. For instance, the sensing data for directions where no objects are present may include the maximum distance value of the effective measurement range.

When the processor (654) receives sensing data for the effective measurement range from the sensor (610), it may calculate a first specified number of polygon vertices from the sensing data based on the object pool. For example, since the implement bus (300) operates at a low speed of 250 kbps and the transmission of a CEFF message for one vertex requires 64 bits of data, including bit stuffing, a maximum of 150 bits may be required per polygon vertex. Therefore, to allow for several updates per second, the processor (654) may calculate 10 to 20 polygon vertices from a single sensing data set. Therefore, to allow for several updates per second, the processor (654) may calculate 10 to 20 polygon vertices from a single set of sensing data. In this regard, when the processor (654) receives sensing data, it may parse the object pool from the memory (653) and acquire characteristic values of the polygon object corresponding to the sensing data based on the object pool. The processor (654) may verify the first specified number of vertices according to the acquired characteristic values and calculate the verified number of vertices. For example, the sensing data may be sensor messages or laser scan messages from ROS1/ROS2. In this case, the sensing data may include an array of distance values (range array) for hundreds to thousands of radiation directions, each defined by a minimum angle, maximum angle, and angle increment. In this case, the processor (654) may sample the distance value array to a first resolution (lower resolution than the distance value array) by selecting only the distance value array of the specified number of vertices from among the distance value array each of hundreds to thousands of radiation directions.

According to one embodiment, the processor (654) may calculate the positions of polygon vertices based on the directional differences and area ratios between the effective measurement range (or the detected distance values) and the polygon object.

According to one embodiment, the processor (654) may calculate the positions of the polygon vertices using a Cartesian coordinate system, where the center of the polygon object is set as the origin, and the forward direction of the tractor equipped with the spatial information sensor apparatus (600) is aligned with the top direction of the polygon object to be output.

According to one embodiment, the processor (654) may determine a scale by using the ratio between the diameter of the effective measurement range and one side of the polygon object (e.g., the width or height of the polygon object). The processor (654) may calculate the vertices located within the polygon object by converting the distance values of the sensing data using the determined scale. Accordingly, the processor (654) may reposition (or constrain) the calculated vertices within the range representable by the polygon object.

According to one embodiment, the processor (654) may skip or select the received sensing data based on a specified update rate (hereinafter referred to as the "second update rate") and calculate polygon vertices for the selected sensing data. For example, the processor (654) may skip or select sensing data generated by the sensor (610) at a first update rate to match the second update rate, which is lower than the first update rate. For instance, the sensor (610) may generate and transmit sensing data for spatial information at a first update rate of 30 Hz, producing 30 data points per second. In contrast, the processor (654) may select 10 data points per second at a second update rate of 10 Hz while ignoring the remaining sensing data.

According to one embodiment, the processor (654) may adjust the specified update rate based on at least one variable, such as the usage status of the virtual terminal (400) or the load status (e.g., estimated load) of the implement bus (300) (referred to as the "specified interface").

According to one embodiment, when adjusting the specified update rate based on the usage status of the virtual terminal (400), the processor (654) may receive a status message of the virtual terminal (400) via the second communication module (652) and verify the usage status of the virtual terminal (400) based on the received status message. The processor (654) may skip the received sensing data if at least one of the following conditions is met: the status message is not received within a specified period (e.g., 3 seconds, indicating that the virtual terminal (400) is in a shut-down state); the status message indicates that the virtual terminal (400) is in a busy state; or the recipient of the status message is not the spatial information sensor apparatus (600).

According to one embodiment, when adjusting the specified update rate based on the load status of the implement bus (300), the processor (654) may estimate the load status of the implement bus (300) based on CEFF (Classical Extended Frame Format) messages or CBFF (Classical Basic Frame Format) messages received via the implement bus (300) within a unit time. If the estimated load status exceeds a specified saturation level (e.g., when the estimated load exceeds a specified load threshold), the processor (654) may skip the received sensing data. For example, the processor (654) may calculate: 1) the total number of data bits of all CEFF (Classical Extended Frame Format) messages or CBFF (Classical Basic Frame Format) messages received via the implement bus (300), 2) the product of the number of CEFF messages and the number of data bits (including IFS) for CEFF messages with a DLC (data length code) field value of 0, and 3) the product of the number of CBFF messages and the number of data bits for CBFF messages with a DLC field value of 0. The processor (654) may estimate the load status (or load level) of the implement bus (300) as the averaged sum of the results calculated in 1), 2), and 3).

According to one embodiment, the processor (654) may construct a polygon object corresponding to the vertices calculated from the selected sensing data of the sensor (610). The processor (654) may transmit the data related to the polygon object to the virtual terminal (400) via the second communication module (652).

According to one embodiment, the processor (654) may configure the data related to the polygon object differently depending on the version of the virtual terminal (400). For example, if the version (ISOBUS VT version) of the virtual terminal (400) is 3 or below, the processor (654) may construct a polygon object that includes all polygon vertices based on the sensing data and transmit the data related to the constructed polygon object to the virtual terminal (400) via the second communication module (652). As another example, if the version of the virtual terminal (400) is 4 (the first version) or higher, the processor (654) may generate a polygon point change command to update the polygon vertices that are identified as changed based on the sensing data. The processor (654) may transmit the generated polygon point change command to the virtual terminal (400) via the second communication module (652). As an additional example, if the version of the virtual terminal (400) is 4 or higher, the processor (654) may compare the transmission volume of the data related to the polygon object with transmission volume of the polygon point change command and transmit the data with the relatively smaller transmission volume to the virtual terminal (400).

According to one embodiment, the processor (654) may select sensing data at a third update rate that exceeds the specified update rate while in debugging mode. The debugging mode may be a mode for the initial setup or error correction of the spatial information sensor apparatus (600) and may be activated when the tractor (10) is in a stationary or low-speed state. The debugging mode may be set, for example, through user input from the virtual terminal (400) or an auxiliary input device. The processor (654) may detect the debugging mode selection event from the implement bus (300) via the second communication module (652).

Additionally or alternatively, in debugging mode, the processor (654) may construct a polygon object that includes a second specified number of vertices exceeding the first specified number. The processor (654) may transmit data related to the polygon object, including the second specified number of vertices (e.g., object pool-related CAN data frames), to the virtual terminal (400) via the second communication module (652). The second specified number may, for example, be an integer multiple of the first specified number. The second specified number may be the maximum number of vertices that may be included in the area defined by the width or height of the polygon object within the effective measurement range. Accordingly, in debugging mode, the spatial information sensor apparatus (600) according to one embodiment may support the diagnosis or repair of at least some components of the spatial information sensor apparatus (600) (e.g., the sensor (610)) based on a more detailed representation of the polygon object.

Additionally or alternatively, in debugging mode, the processor (654) may lower the transmission priority of the second communication module (652) (e.g., setting it to the lowest priority). In debugging mode, the transmission volume of data related to polygon objects increases significantly, which may cause delays in the transmission of more critical data between the engine ECU (650) and other components (e.g., the driving unit (e.g., 110, 120)). To prevent this, the processor (654) may reduce the transmission priority of debugging mode data. By doing so, it may mitigate issues where the transmission and reception of critical data are disrupted by debugging data (e.g., data related to polygon objects).

In one embodiment, when the processor (654) detects that debugging mode has been deactivated and transitioned to normal mode, it may restore the update rate and the number of vertices to the settings for normal mode. In normal mode, the processor (654) may select sensing data based on the second update rate and calculate the first specified number of vertices from the selected sensing data.

As described above, the tractor (10) according to one embodiment is connected to the spatial information sensor apparatus (600) via the implement bus (300). By acquiring and utilizing 2D/3D spatial information, the tractor 10 evolves from simply autonomously driving along pre-configured routes based solely on current positional information to supporting three-dimensional autonomous driving based on the 2D/3D spatial information provided by the spatial information sensor apparatus (600).

Additionally, in one embodiment, the operator of the tractor (10) may check the safe zone determined by the tractor ECU (100) on the display. By comparing it with their direct assessment of the actual environment, the operator may recognize potential hazardous situations and respond quickly, such as by terminating autonomous driving.

Furthermore, in one embodiment, the spatial information sensor apparatus (600) may only represent real-time low-resolution polygons during tractor operation due to the low bandwidth (250 kbps) of the CAN 2.0-based ISOBUS. However, in debugging mode during stationary or low-speed conditions, it is possible to verify the sensing status of the spatial information sensor apparatus (600) solely through the ISOBUS virtual terminal (400) by representing high-resolution polygons.

Figure 9:
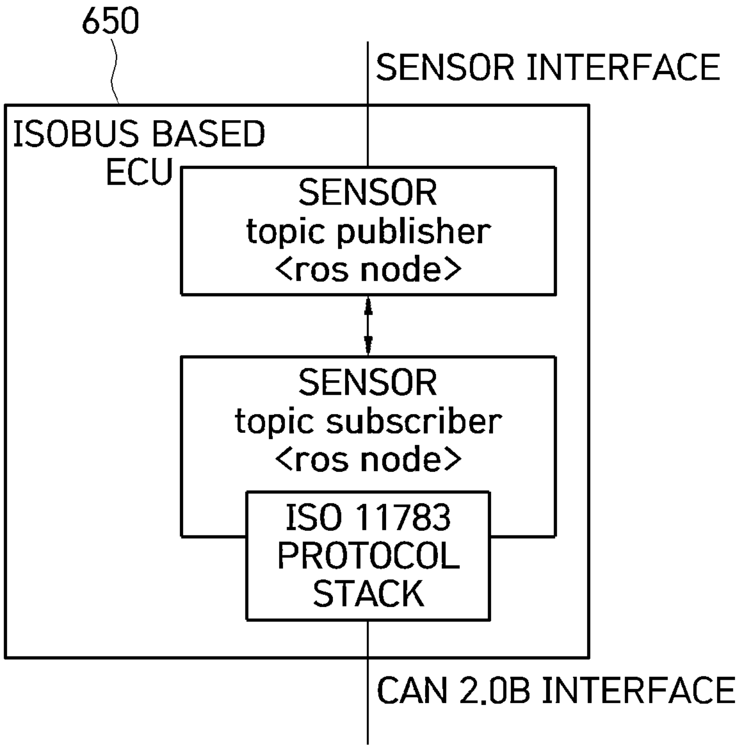
FIG. 9 illustrates an example of main computing nodes and interfaces that constitute the spatial information sensor apparatus according to one embodiment.

FIG. 9 illustrates an example of the main computing nodes and interfaces constituting the spatial information sensor apparatus according to one embodiment.

Referring to FIG. 9, according to one embodiment, the ECU (650) may store one or more executable files in the memory (653) and perform operations such as acquisition (e.g., reception or selection) of sensing data, format conversion, and transmission based on the executable files. For example, the ECU (650) may store a first executable file for publishing sensing data as ROS (Robot Operating System) topics (corresponding to the sensor topics) and a second executable file for subscribing to ROS topics to receive sensing data and convert it in real time to the ISO 11783 protocol. In this case, the processor (654) (or the first communication module (651)) may publish the sensing data acquired through the sensor interface to an ROS topic in real time via the first executable file. Additionally, the processor (654) (or the second communication module (652)) may subscribe to the ROS topic via the second executable file to receive the sensing data topic and convert it to the ISO 11783 protocol in real time. The first and second executable files may be implemented as ROS1 or ROS2 node software platforms. The functionalities of the first and second executable files may also be integrated into a single executable file.

In this context, ROS is a software library and toolset for developing robotic applications, providing tools such as the RVIZ program, which displays sensing values from various sensors in a robot. Through the RVIZ program, sensing data from devices such as stereo vision cameras, LiDAR sensors, and laser sensors, which scan a specific area around the robot, may be visualized. Visualized spatial sensing data is not only crucial during the development of robotic applications but may also be utilized by robot users to monitor the surrounding environment in real time during autonomous driving.

Figure 10:
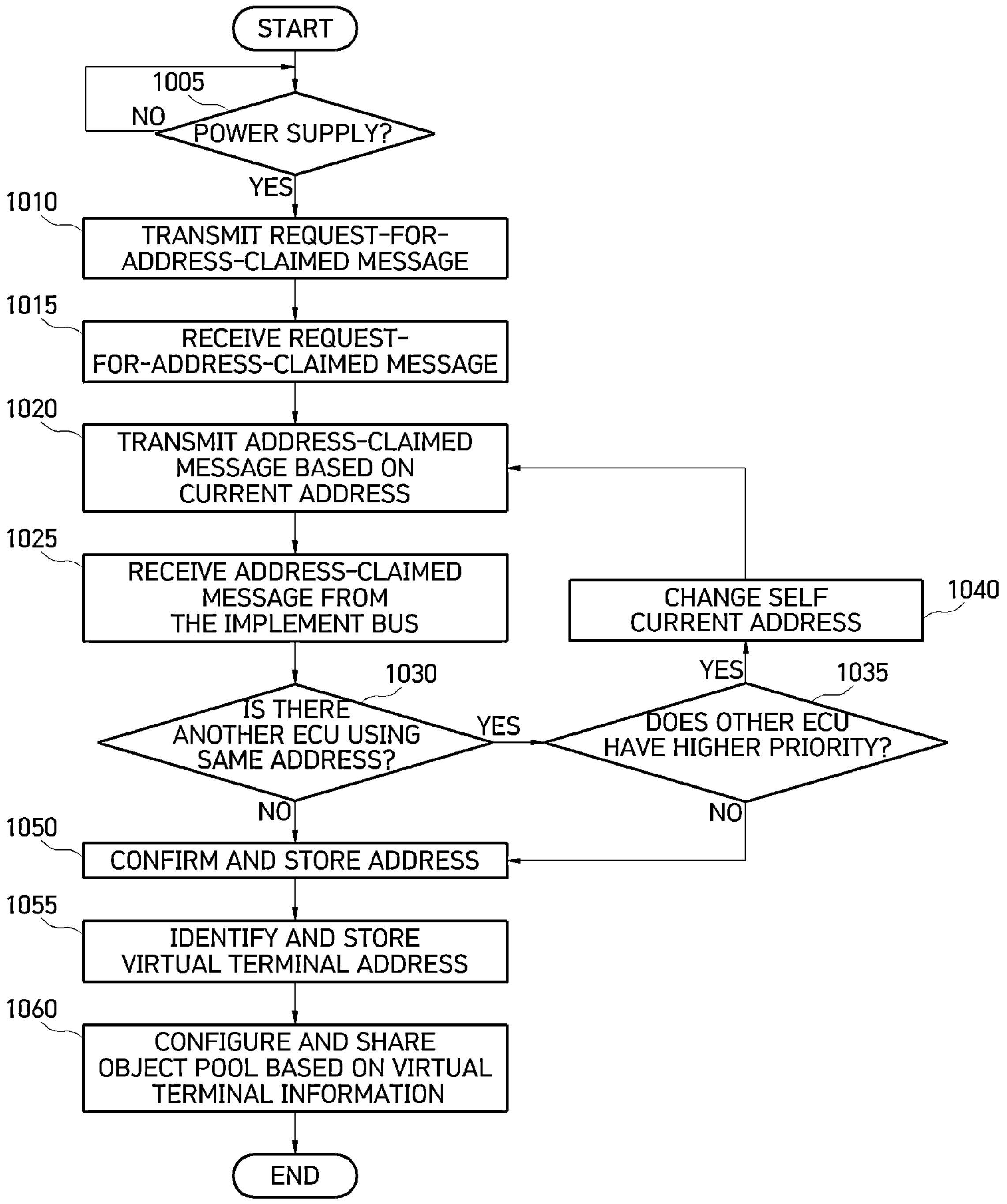
FIG. 10 illustrates a flowchart for the initialization and virtual terminal communication setup process of the spatial information sensor apparatus according to the ISO 11783 standard in one embodiment.

FIG. 10 illustrates a flowchart of the initialization of a spatial information sensor and the communication setup with a virtual terminal according to the ISO 11783 standard in one embodiment.

Referring to FIG. 10, in operation 1005, the ECU (650) is activated by a power supply. In operation 1010, the ECU 650 may transmit a request-for-address-claimed message with a source address set to 254 (NULL address) as a global address message (with destination address set to 255) via the implement bus 300.

In operation 1015, the ECU (650) may receive the request-for-address-claimed message it transmitted via the implement bus (300).

In operation 1020, the ECU (650) may transmit an address-claimed message, which includes a preset current address (default address value for the initial response), via the implement bus (300).

In operation 1025, the ECU (650) may receive address-claimed messages transmitted by other ECUs (e.g., the virtual terminal (400), the tractor ECU (100)) connected to the implement bus (300), as well as the address-claimed message it transmitted, via the implement bus (300).

In operation 1030, the ECU (650) may determine whether any other ECU is using the same address based on the received address-claimed messages.

If, in operation 1030, the ECU (650) determines based on the address-claimed messages that no other ECU is using an address conflicting with its current address, it may proceed to operation 1050, confirm the current address, and store the confirmed address.

On the other hand, if the ECU (650) determines that another ECU exists with a conflicting current address, it may, in operation 1035 and operation 1040, decide whether to use the current address (in which case it resends an address-claimed message via the implement bus (300)) or to change the current address, based on the NAME value contained in the payload of the address-claimed message received from the other ECU and the priority of its own NAME value. If conflicts persist, the ECU (650) may repeat operations 1020 through 1040 until the address is finalized The address request and confirmation operations described above may be repeated not only immediately after power is supplied but also whenever an address-claimed message is received from a newly attached implement ECU (200) on the implement bus (300).

In operation 1055, the ECU (650) may store the source address of a message corresponding to hexadecimal 1D, which represents "Virtual Terminal (in cab)" as the NAME value (Function) included in the message received from the implement bus (300) based on the ISOBUS 11783 standard, as the address of the virtual terminal (400).

In operation 1060, the ECU (650) may use the address of the virtual terminal (400) to communicate with the virtual terminal (400), update the object pool to correspond to the virtual terminal (400), and share the updated object pool with the virtual terminal (400). For example, the ECU (650) may transmit a working set master message and a working set number message (sent if necessary) to the stored address of the virtual terminal (400) in accordance with the ISO 11783-6 and ISO 11783-7 standards to register the working set with the virtual terminal (400). Additionally, the ECU (650) may send a Get Memory message, as defined in ISO 11783-6, to the identified address of the virtual terminal (400) and determine the version of the virtual terminal (400) based on the response to the Get Memory message. Alternatively, the ECU (650) may send messages such as get number of soft keys or get text font data and store the responses from the virtual terminal (400). Based on the received VT version, the number of soft keys, and text font data information, the ECU (650) may modify the object pool to transmit the modified object pool to the address of the virtual terminal (400). During this process, the ECU (650) may use transport protocol or extended transport protocol for transmission, and upon completion of the transmission, it sends an End of Object Pool message.

Figure 11:
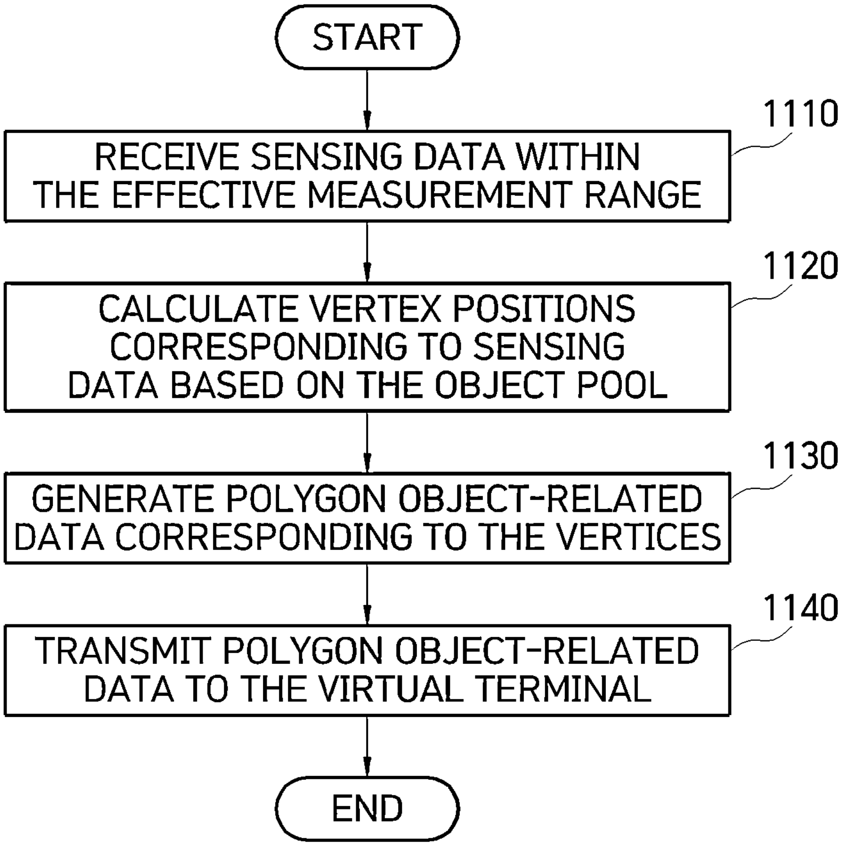
FIG. 11 illustrates a flowchart of the spatial information sensor control method according to one embodiment.

FIG. 11 illustrates a flowchart of a spatial information sensor control method according to one embodiment.

Referring to FIG. 11, in operation 1110, the ECU (650) may receive sensing data from the sensor (610) regarding distance values to surrounding object within the effective measurement range. The sensing data may be generated based on distance measurements to surrounding objects within a specified azimuth angle range (e.g., 360 degrees in all directions) of the effective measurement range by the sensor (610). The sensing data may include an array of multiple distance values (ranges) to surrounding objects.

In operation 1120, the ECU (650) may calculate polygon vertices related to the sensing data based on the object pool stored in the memory (653). For example, the ECU (650) may calculate the positions of the polygon vertices so that they are positioned within the polygon object based on the directional differences and area ratios between the effective measurement range (or the detected distance values) and the polygon object.

In operation 1130, the ECU (650) may generate data related to the polygon object corresponding to the calculated polygon vertices.

In operation 1140, the ECU (650) may transmit data related to the polygon object to the virtual terminal (400) via the implement bus (300). If the vertices have been updated, the ECU (650) may send the polygon object containing the updated vertices to the virtual terminal (400) using the same object ID as before.

Figure 12:
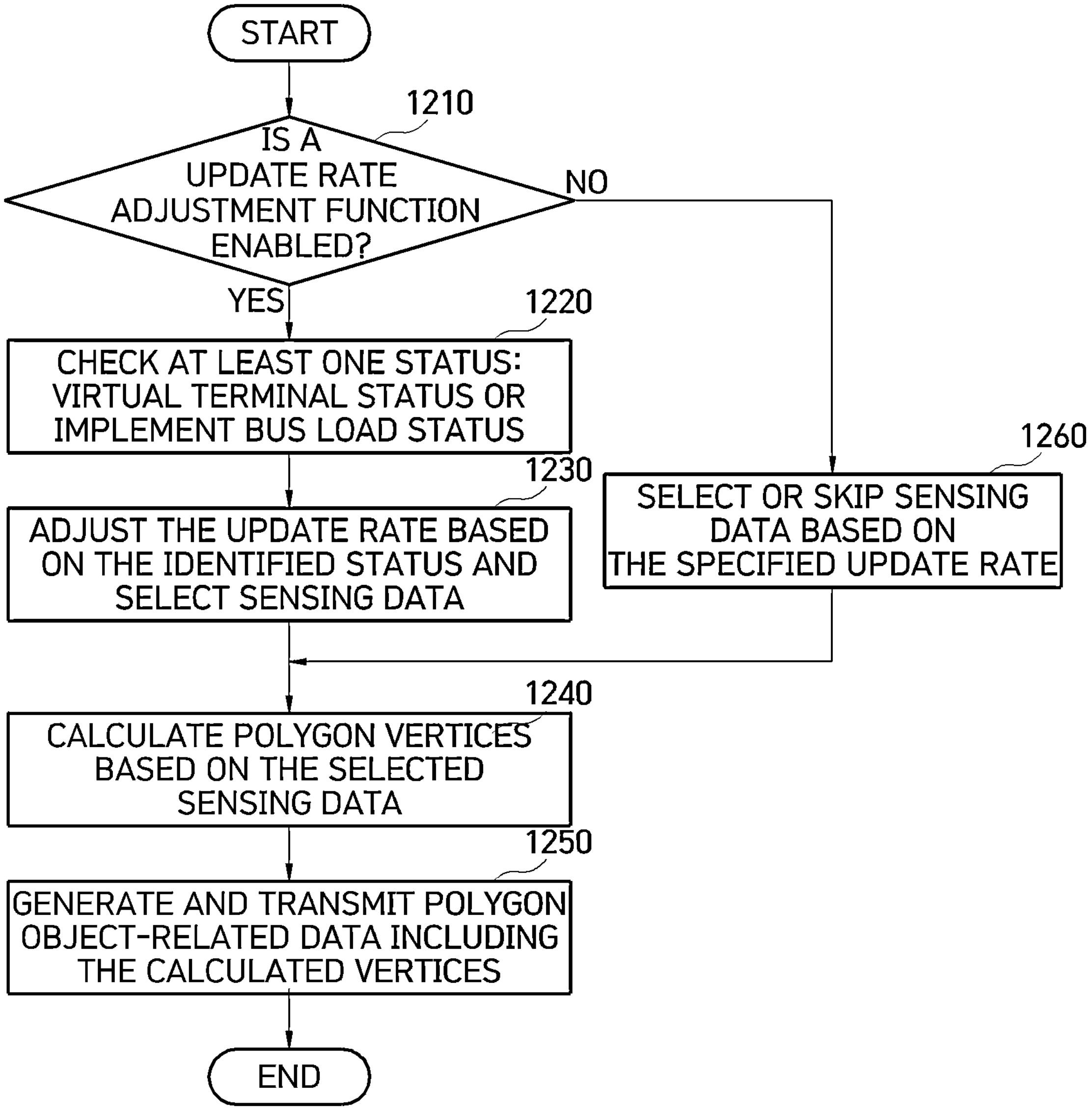
FIG. 12 illustrates a flowchart of the method for generating/updating polygon objects in general mode according to one embodiment.

FIG. 12 illustrates a flowchart of a method for generating/updating polygon objects in normal mode according to one embodiment.

Referring to FIG. 12, in operation 1210, the ECU (650) may check whether the update rate adjustment function has been enabled. If the ECU (650) determines in operation 1210 that the update rate adjustment function is not enabled, it may proceed to operation 1260 to select sensing data to be used for generating/updating the polygon object based on the specified update rate (the second update rate). The update rate adjustment function may be set through user input via the virtual terminal (400) or a default setting.

If the ECU (650) determines in operation 1210 that the update rate adjustment function is enabled, it may proceed to operation 1220 to check at least one status of the usage status of the virtual terminal (400) or the load status of the implement bus (300). For example, the ECU (650) may check whether any of the following conditions are met: the virtual terminal status message is received within a specified period (e.g., 3 seconds); the "busy" code (byte 7) of the virtual terminal (400) in the received status message is set; the destination address of the active working set master in the status message (source address of active working set master) is not the address of the ECU (650); or the estimated load of the implement bus (300) exceeds a specified load threshold.

In operation 1230, the ECU (650) may adjust the specified update rate based on the usage status and load status of the virtual terminal (400). For example, if the ECU (650) determines from the virtual terminal status message that the virtual terminal (400) is in a shutdown state, is busy, or that the message was sent to another device, it may skip the sensing data and omit updating the polygon object based on that data. More specifically, if the ECU (650) does not receive a virtual terminal status message within a specified period (e.g., 3 seconds), it may determine that the virtual terminal (400) is in a shutdown state and skip the received sensing data. The ECU (650) may skip the received sensing data if the "busy" code (byte 7) of the virtual terminal (400) is set in the status message. Additionally, the ECU (650) may skip the received sensing data if the source address of the active working set master in the status message is not the confirmed address of the ECU (650). As another example, the ECU (650) may estimate the load status (e.g., load level) of the implement bus (300) based on the received CAN frames. If the estimated load level exceeds the threshold load level, the ECU (650) may also skip the received sensing data. Conversely, if the ECU (650) determines from the status message that the virtual terminal (400) is in an available state (e.g., the "busy" code is not set), the status message is addressed to the ECU (650), and the load level of the implement bus (300) is below the specified threshold, the ECU (650) may select the received sensing data for use in updating the polygon object.

In operation 1240, the ECU (650) may calculate polygon vertices using at least some of the distance values from the selected sensing data.

In operation 1250, the ECU (650) may generate, configure, or update a polygon object including the calculated vertices and transmit data related to the generated, configured, or updated polygon object to the virtual terminal (400).

In the aforementioned embodiment, if the tractor (10) according to one embodiment does not support the update rate adjustment function, operations 1210 to 1230 may be omitted.

As described above, the spatial information sensor apparatus (600) according to one embodiment may adjust the update rate of the sensing data based on the load status of the virtual terminal (400) and the implement bus (300) (corresponding to the variables). This allows the apparatus 600 to transmit sensing data without significantly increasing the traffic on the implement bus (300).

Figure 13:
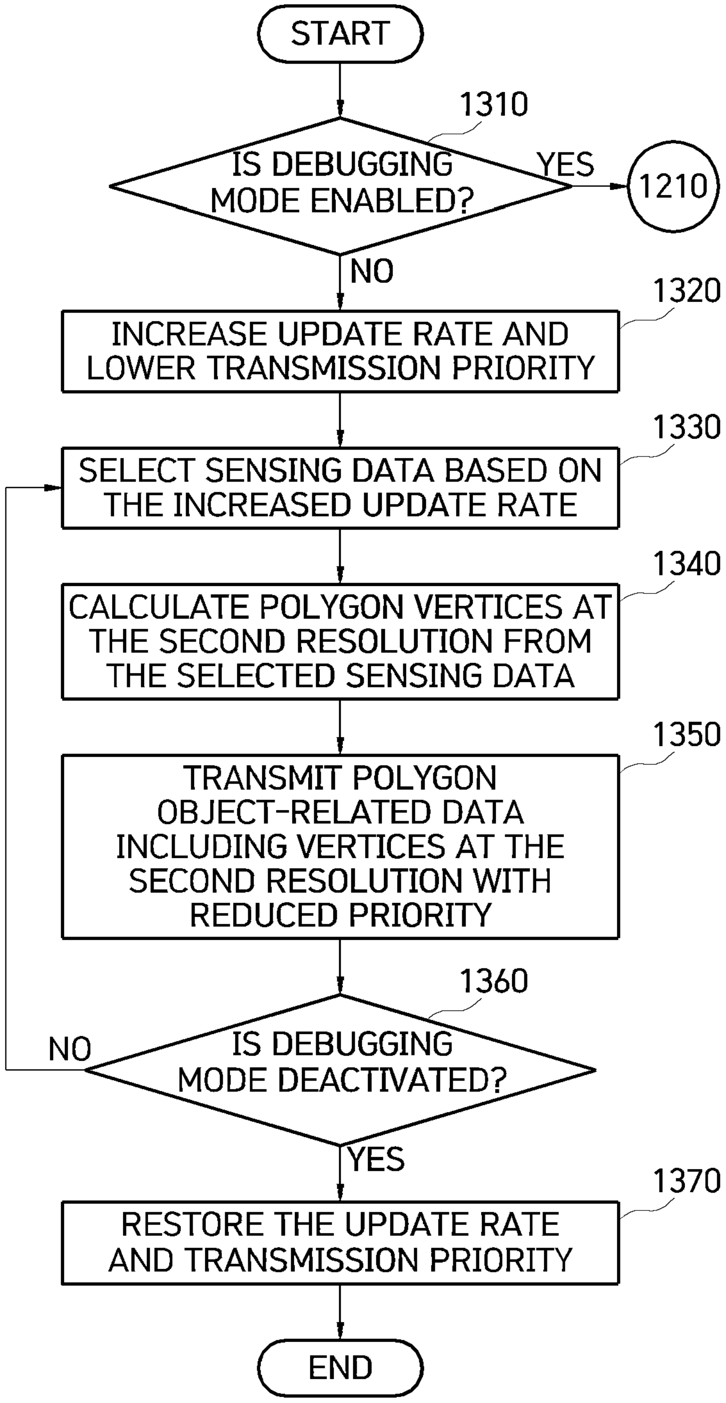
FIG. 13 illustrates a flowchart of the method for updating polygon objects in debugging mode according to one embodiment.

FIG. 13 illustrates a flowchart of a method for updating polygon objects in debugging mode according to one embodiment.

Referring to FIG. 13, in operation 1310, the ECU (650) may determine whether debugging mode has been enabled based on the messages received via the implement bus (300). If the ECU (650) determines in operation 1310 that debugging mode has not been enabled via the implement bus (300), it may perform operation 1210 from FIG. 12. In this case, the ECU (650) may update the polygon object in normal mode. The debugging mode may be a mode for the initial setup or error correction of the spatial information sensor apparatus (600). And The debugging mode can be enabled when the tractor (10) is in a stationary or low-speed state. The debugging mode may, for example, be configured through user input via the virtual terminal (400).

In operation 1310, if the ECU (650) determines that debugging mode is enabled, it may transition to debugging mode in operation 1320, increase the specified update rate to a third update rate, and set the transmission priority for the virtual terminal (400) to the lowest priority. For example, in debugging mode, if the version of the virtual terminal (400) is 5 or below, the ECU (650) may set the transmission priority for the virtual terminal (400) to 7. If the version is 6 or above, the ECU (650) may also set the transmission priority to 7.

In operation 1330, the ECU (650) may select or skip the received sensing data based on the increased update rate.

In operation 1340, the ECU (650) may calculate object vertices at a second resolution exceeding the first resolution using the array of distance values included in the selected sensing data.

In operation 1350, the ECU (650) may construct (e.g., generate or update) a polygon object that includes the object vertices at the second resolution. And the ECU (650) may transmit data related to the constructed polygon object to the virtual terminal (400) via the implement bus (300) based on the lowered priority.

In operation 1360, the ECU (650) may monitor whether debugging mode has been deactivated and continue performing operations 1330 to 1350 until debugging mode is deactivated.

In operation 1360, if the ECU (650) confirms the deactivation of debugging mode, it may proceed to operation 1370 to switch to normal mode, and restore the update rate and transmission priority to their pre-debugging mode settings.

As described above, the spatial information sensor apparatus (600) according to one embodiment may only represent real-time low-resolution polygons during tractor operation due to the low bandwidth (250 kbps) of the CAN 2.0-based ISOBUS. However, in debugging mode during stationary or low-speed conditions, it is possible to verify the sensing status of the spatial information sensor apparatus (600) solely through the ISOBUS virtual terminal (400) by representing high-resolution polygons.

Additionally, the spatial information sensor apparatus (600) according to one embodiment may prevent issues where the transmission and reception of critical data required for tractor operation are disrupted due to the transmission and reception of high-resolution polygon object-related data by lowering the transmission priority in debugging mode.

Figure 14:
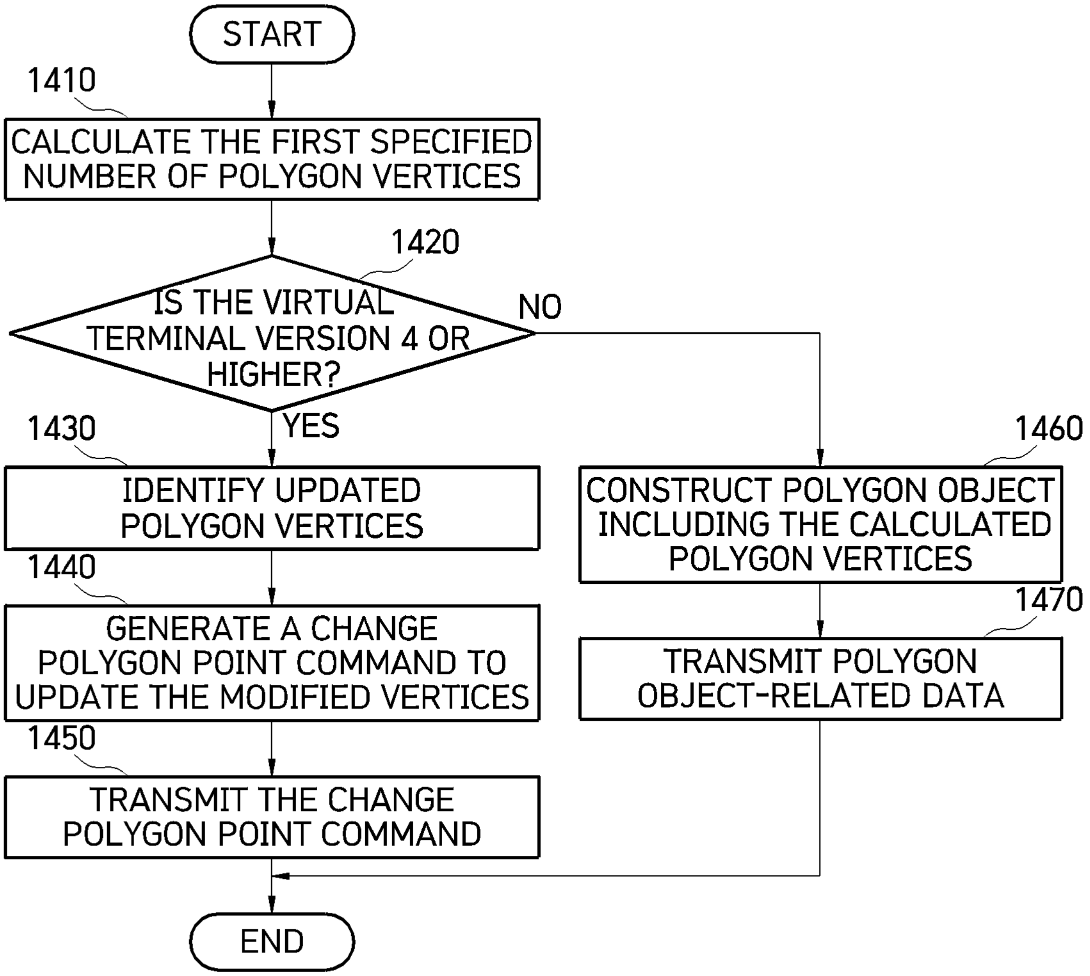
FIG. 14 illustrates a flowchart of the method for updating polygon objects according to the virtual terminal version in one embodiment.

FIG. 14 illustrates a flowchart of the method for updating polygon objects according to the virtual terminal version in one embodiment.

Referring to FIG. 14, in operation 1410, the ECU (650) may calculate a first specified number of polygon vertices from the selected sensing data based on the object pool.

In operation 1420, the ECU (650) may determine whether the version of the virtual terminal (400) is 4 or higher. For example, the ECU (650) may send a Get Memory message, as defined in ISO 11783-6, to the virtual terminal (400) address and determine the version of the virtual terminal (400) based on the response message received from the virtual terminal (400).

If it is determined in operation 1420 that the virtual terminal (400) is version 4 or higher, the ECU (650) may identify the updated polygon vertices in operation 1430.

In operation 1440, the ECU (650) may generate a changed polygon point command to update the modified polygon vertices of the previously constructed polygon object.

In operation 1450, the ECU (650) may transmit the changed polygon point command to the virtual terminal (400). In this case, the virtual terminal (400) may identify the updated vertex information from the changed polygon point command and update only the modified vertices of the previously displayed polygon object for display.

In operation 1420, if the ECU (650) determines that the version of the virtual terminal is below 4, the ECU (650) may construct a polygon object that includes the calculated polygon vertices in operation 1460.

In operation 1470, the ECU (650) may transmit the data related to the constructed polygon object to the virtual terminal (400) via the implement bus (300).

Figure 15:
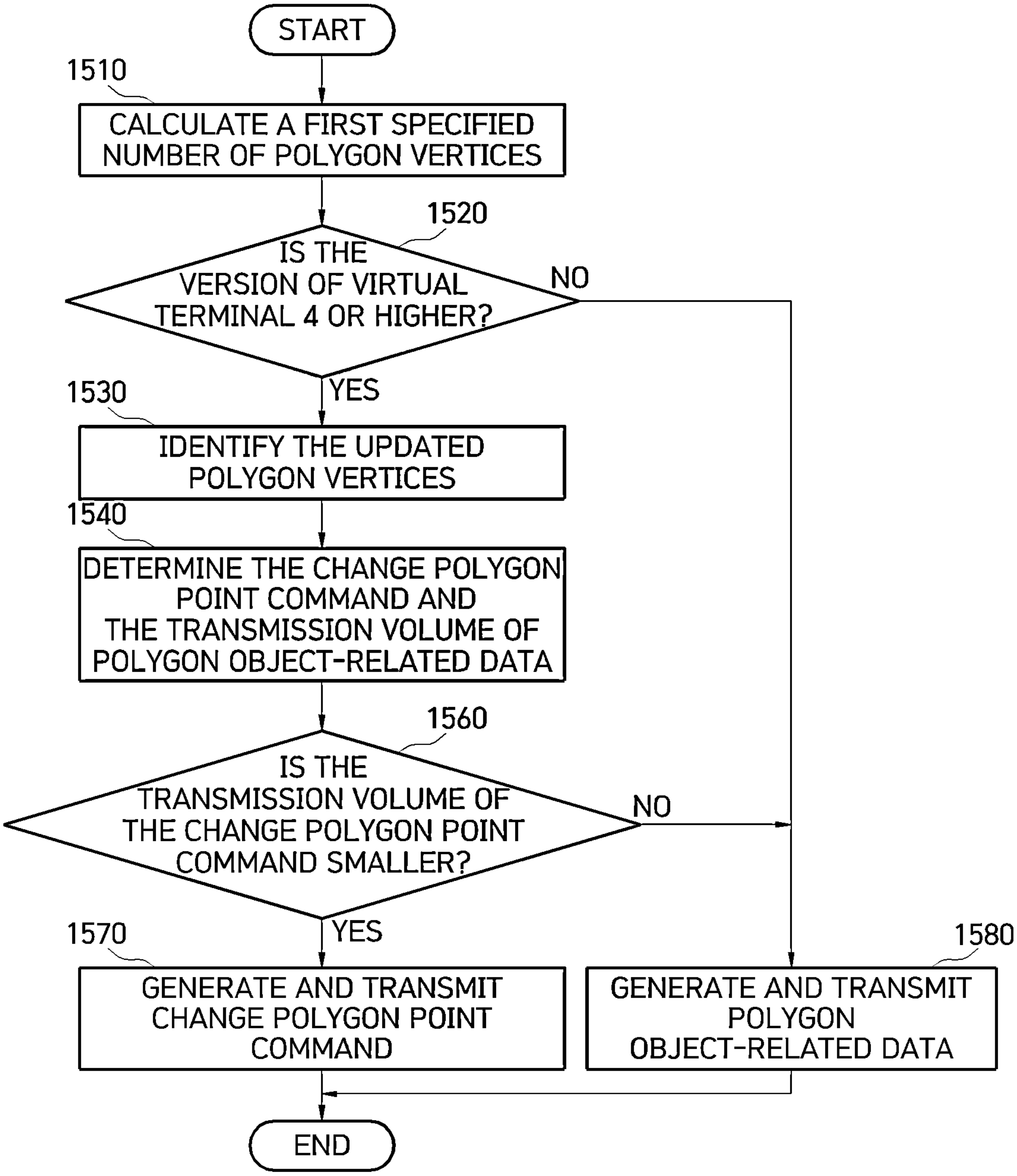
FIG. 15 illustrates a flowchart of the method for updating polygon objects based on the virtual terminal version and data transmission volume in one embodiment.

FIG. 15 illustrates a flowchart of the method for updating polygon objects based on the virtual terminal version and data transmission volume in one embodiment.

Referring to FIG. 15, in operation 1510, the ECU (650) may calculate a first specified number of polygon vertices from the selected sensing data based on the object pool.

In operation 1520, the ECU (650) may determine whether the version of the virtual terminal is 4 or higher. For example, the ECU (650) may send a Get Memory message, as defined in ISO 11783-6, to the virtual terminal (400) address and determine the version of the virtual terminal (400) from the response message received from the virtual terminal (400).

If it is determined in operation 1520 that the virtual terminal (400) is version 4 or higher, the ECU (650) may identify the updated polygon vertices in operation 1530.

The ECU (650) may respectively determine the transmission volume 'the change polygon point command' to update the modified polygon vertices and the transmission volume related to the polygon object transmission. The change polygon point command requires 64 bits to update a single vertex, while polygon object transmission requires 16 bytes (112 bits) of header data, 32 bits to update a single vertex, and 16 bits for each of up to 255 event and macro pairs. Accordingly, the ECU (650) may calculate the total number of data bits for each and determine the transmission volume required for updating the modified polygon vertices.

In operation 1560, the ECU (650) may determine whether the total transmission volume of the change polygon point command is less than the total transmission volume of the data related to the polygon object.

If the ECU (650) determines in operation 1560 that the total transmission volume of the change polygon point command is relatively smaller, it may proceed to operation 1570 to transmit the change polygon point command to the address of the virtual terminal (400).

If the ECU (650) determines in operation 1560 that the total transmission volume required for transmitting the polygon object-related data is relatively smaller, it may proceed to operation 1580 to generate the data related to polygon object and transmit the generated data to the address of the virtual terminal (400).

As described above, the spatial information sensor apparatus (600) according to one embodiment may select and transmit data related to the polygon object in normal mode using the method with the relatively smaller transmission volume, thereby mitigating transmission and reception delays caused by the implement bus (300) to some extent.

Figure 16:
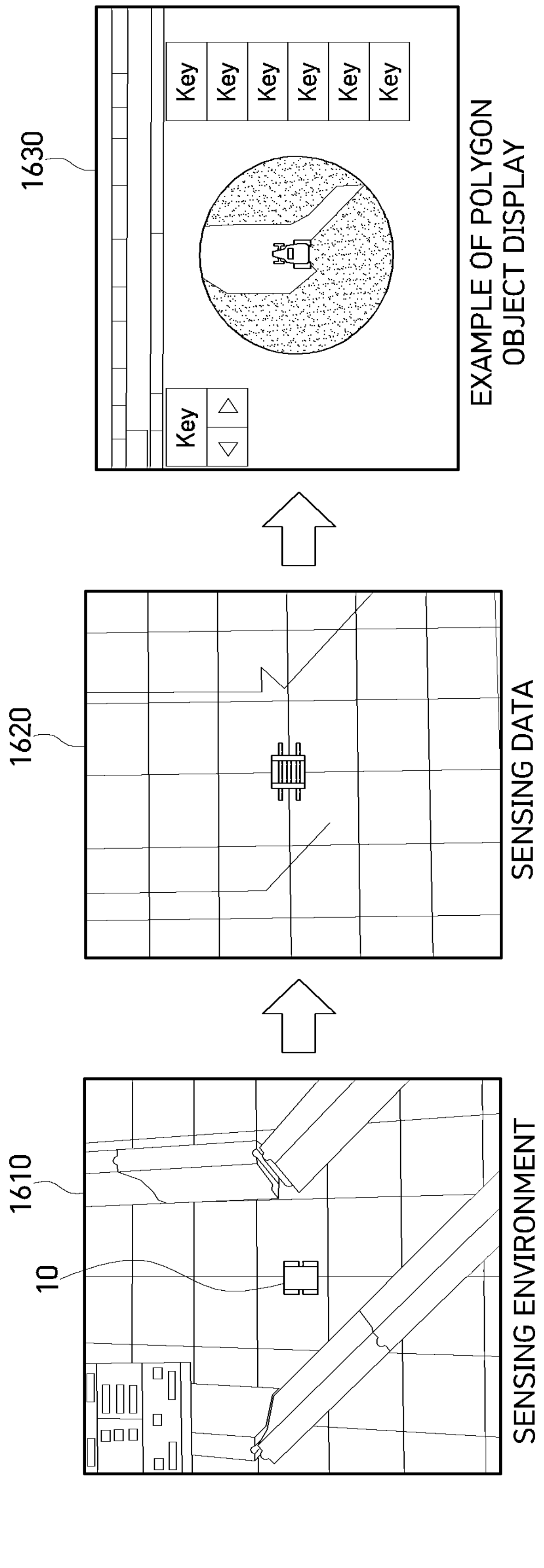
FIG. 16 illustrates an example of data related to polygon objects according to one embodiment.

FIG. 16 illustrates an example diagram of data related to a polygon object according to one embodiment.

As shown in the illustration (1610) of FIG. 16, the tractor (10), via its spatial information sensor apparatus 600, may detect an environment where angled walls are present on its left and right sides.

As shown in the illustration (1620) of FIG. 16, the sensor (610) of the spatial information sensor apparatus (600) may generate sensing data that includes an array of distance values for the walls located on the left and right sides within the effective measurement range of the detected environment.

As shown in the illustration (1630) of FIG. 16, the ECU (650) of the spatial information sensor apparatus (600) may calculate polygon vertices corresponding to a first specified number of distance values from the array of distance values included in the sensing data. And the ECU (650) may construct a polygon object that includes the calculated polygon vertices. Meanwhile, if the first specified number (number of vertices) is set to approximately 10 to 20, the polygon object displayed by the virtual terminal (400) that includes the calculated vertices may have low visibility. In this case, the virtual terminal (400) may fill the interior of the polygon object (polygon) formed by the connected polygon vertices with specified pixel values.

Thus, according to one embodiment, the spatial information sensor apparatus (600) is configured for autonomous driving. It generates polygon objects representing area information around the tractor or implement and outputs these objects to the ISOBUS virtual terminal (400) installed in the ISOBUS-based tractor cabin. This configuration enables the user to monitor area information in real time during driving through the virtual terminal (400).

Additionally, the tractor ECU (100) according to one embodiment may consider areas within the sensing range that are not intruded upon by surrounding objects (obstacles) as safe zones and enable the tractor to drive accordingly in safe zones. The user (tractor operator) may verify the safe zones determined by the autonomous tractor (10) on the display and directly intervene, such as by terminating autonomous driving, if the displayed safe zones differ from the user's visual assessment of the actual environment.

The various embodiments and terms used in this document are not intended to limit the technical features described herein to specific embodiments but should be understood to include various modifications, equivalents, or alternatives of the described embodiments. Regarding the description of the drawings, similar or related components may be referenced with similar reference numerals. Unless explicitly indicated otherwise in the relevant context, singular forms of nouns corresponding to items may include one or multiple of the described items. Phrases such as "A or B," "at least one of A and B," "at least one of A or B," "A, B, or C," "at least one of A, B, and C," and "at least one of A, B, or C" may each include any one of the listed items or all possible combinations of those items. Terms like "first," "second," "primary," or "secondary" may simply be used to distinguish one component from another and do not limit the components in terms of other aspects (e.g., importance or sequence). When a (e.g., first) component is described as being "functionally" or "communicatively" (with or without these terms) "coupled" or "connected" to another (e.g., second) component, it means that the first component may be connected to the second component directly (e.g., via wired connection), wirelessly, or through a third component.

The term "module," as used in this document, may include units implemented in hardware, software, or firmware, and it can be used interchangeably with terms such as logic, logic block, component, or circuit. A module may be an integrated component or the minimum unit or a part thereof that performs one or more functions. For example, in one embodiment, the module may be implemented in the form of an ASIC (application-specific integrated circuit).

The various embodiments described in this document may be implemented as software (e.g., a program) stored on a machine-readable storage medium (e.g., the memory 653 of FIG. 6), such as embedded memory or external memory. For example, the processor (e.g., processor 654) of a device (e.g., the spatial information sensor apparatus 600) may retrieve at least one instruction from the storage medium and execute it. This enables the device to operate and perform at least one function according to the retrieved instruction. The one or more instructions may include code generated by a compiler or code executable by an interpreter. The machine-readable storage medium may be provided in the form of a non-transitory storage medium. Here, "non-transitory" means that the storage medium is a tangible device and does not include signals (e.g., electromagnetic waves). This term does not distinguish whether data is stored on the storage medium permanently or temporarily.

According to one embodiment, the methods described in the various embodiments disclosed in this document may be provided as part of a computer program product. The computer program product may be transacted as a commodity between a seller and a buyer. It may be distributed in the form of a machine-readable storage medium (e.g., a compact disc read-only memory (CD-ROM)) or distributed online (e.g., via download or upload) through an application store (e.g., Play Store™) or directly between two user devices (e.g., smartphones). In the case of online distribution, at least part of the computer program product may be temporarily stored or temporarily created on a machine-readable storage medium, such as the memory of a manufacturer's server, an application store server, or an intermediary server.

The components described in the various embodiments of this document may be implemented in the form of software or hardware, such as a digital signal processor (DSP), field-programmable gate array (FPGA), or application-specific integrated circuit (ASIC), and are capable of performing specific functions. The term "components" is not limited to software or hardware; each component may be configured to reside on an addressable storage medium or to activate one or more processors. For example, components may include software components, object-oriented software components, class components, and task components, as well as processes, functions, attributes, procedures, subroutines, segments of program code, drivers, firmware, microcode, circuits, data, databases, data structures, tables, arrays, and variables.

According to various embodiments, each of the aforementioned components (e.g., modules or programs) may include a single entity or multiple entities. In some embodiments, one or more of the aforementioned components or operations may be omitted, or one or more additional components or operations may be included. Alternatively or additionally, multiple components (e.g., modules or programs) may be integrated into a single component. In such cases, the integrated component may perform one or more functions of the individual components in the same or a similar manner as they were performed prior to integration. According to various embodiments, operations performed by a module, program, or other component may be executed sequentially, in parallel, iteratively, heuristically, or in a different order than described. Additionally, one or more operations may be omitted, or one or more new operations may be added.

What is claimed is:

1. An ISOBUS-based spatial information sensor apparatus of an autonomous driving equipment, comprising:

a sensor capable of detecting distances to surrounding objects of the autonomous driving equipment within an effective measurement range;

a communication module configured to support communication through a specified interface based on ISOBUS with a virtual terminal in the autonomous driving equipment;

a memory configured to store an object pool defining output polygon objects to be displayed on the virtual terminal, wherein the object pool includes:

a background object indicating the effective measurement range of the sensor, a reference object indicating a location of the autonomous driving equipment, and an output polygon object whose vertices are updated in real time in response to sensing data of the sensor; and a processor configured to:

receive the sensing data regarding the effective measurement range from the sensor, calculate polygon vertices of the output polygon object from the sensing data based on the object pool and the sensing data, variably control an amount of data transmission of the output polygon object in accordance with a communication load status of the specified interface and a usage status of the virtual terminal, and transmit data related to the output polygon object corresponding to the calculated vertices to the virtual terminal via the communication module.

2. The spatial information sensor apparatus of claim 1, wherein:

the sensing data includes an array of multiple distance values (ranges) generated by measuring distances to a surrounding object within a specified angular range of the effective measurement range, and the processor converts the sensing data to a specified low resolution by sampling distance values corresponding to a specified number of points from the array of multiple distance values.

3. The spatial information sensor apparatus of claim 1, wherein:

the processor calculates the polygon vertices to be positioned in specified directions within the output polygon object, based on at least one of a directional difference or an area ratio between the effective measurement range and the output polygon object.

4. The spatial information sensor apparatus of claim 3, wherein:

the processor calculates the positions of the vertices by aligning a Cartesian coordinate system, wherein the Cartesian coordinate system defined by positioning the center of the output polygon object at an origin, and aligning a forward direction of an equipment equipped with the spatial information sensor apparatus with a top direction of the output polygon object.

5. The spatial information sensor apparatus of claim 3, wherein:

the processor determines a scale using the ratio between a diameter of the effective measurement range and one side of the output polygon object, and calculates the polygon vertices by converting distance values included in the sensing data according to the determined scale.

6. The spatial information sensor apparatus of claim 1, wherein:

the processor skips or selects the received sensing data according to a specified update rate and calculates the polygon vertices based on the selected sensing data.

7. The spatial information sensor apparatus of claim 6, wherein:

the processor adjusts the update rate based on at least one of a usage status of the virtual terminal or a load of the specified interface.

8. The spatial information sensor apparatus of claim 7, wherein:

when adjusting the update rate based on the usage status of the virtual terminal, the processor skips the received sensing data if at least one of:

1) Determining that the status message of the virtual terminal is not received within a specified period via the communication module, 2) determining that the virtual terminal is in use based on the status message, or 3) Determining that the communication module is not a recipient of the status message.

9. An ISOBUS-based spatial information sensor apparatus, comprising:

a sensor capable of detecting distances to surrounding objects within an effective measurement range;

a communication module supporting communication with a virtual terminal via a specified interface;

a memory storing an object pool defining output polygon objects to be displayed on the virtual terminal; and a processor, wherein the processor:

receives sensing data regarding the effective measurement range from the sensor, calculates polygon vertices from the sensing data based on the object pool, skips or selects the received sensing data according to a specified update rate and calculates the polygon vertices based on the selected sensing data, adjusts the update rate based on a load of the specified interface, wherein: when adjusting the update rate based on the load of the specified interface, the processor estimates the load of the specified interface based on a specified average value of CEFF (Classical Extended Frame Format) messages and CBFF (Classical Basic Frame Format) messages received through the specified interface over a unit time, and skips the received sensing data if the estimated load exceeds a specified load, and transmits data related to a polygon object corresponding to the calculated vertices to the virtual terminal via the communication module.

10. The spatial information sensor apparatus of claim 1, wherein:

the processor transmits data related to the output polygon object differently based on a version of the virtual terminal.

11. The spatial information sensor apparatus of claim 10, wherein:

if the version of the virtual terminal is equal to or greater than a first version, the processor transmits a polygon vertex change command to update changed vertices of the output polygon object to the virtual terminal via the communication module.

12. The spatial information sensor apparatus of claim 11, wherein:

if the version of the virtual terminal is equal to or greater than the first version, the processor compares transmission volume of data related to the output polygon object with the transmission volume of the polygon vertex change command and transmits one having a relatively smaller transmission volume between the data related to the output polygon object and the polygon vertex change command to the virtual terminal via the communication module.

13. The spatial information sensor apparatus of claim 1, wherein:

the processor, upon detecting that a debugging mode is selected via the communication module, transmits data related to the output polygon object including a second specified number of vertices exceeding a first specified number of vertices used in a general mode to the virtual terminal via the communication module.

14. The spatial information sensor apparatus of claim 1, wherein:

the processor, upon detecting that a debugging mode is selected via the communication module, performs at least one of the following operations:

selecting sensing data at an update rate higher than an update rate used in a general mode to calculate the polygon vertices, and setting a transmission priority for transmitting and receiving data related to the output polygon object via the communication module to a priority lower than a transmission priority used in the general mode.

15. A method for controlling an ISOBUS-based spatial information sensor apparatus of an autonomous driving equipment, the method being performed by at least one processor, the method comprising:

receiving sensing data regarding an effective measurement range from a sensor configured to detect distances to surrounding objects of the autonomous driving equipment within the effective measurement range;

calculating polygon vertices of an output polygon object based on an object pool and the sensing data, wherein the object pool defines output polygon objects to be displayed on a virtual terminal in the autonomous driving equipment and includes;

a background object indicating the effective measurement range of the sensor, a reference object indicating a location of the autonomous driving equipment, and the output polygon object whose vertices are updated in real time in response to the sensing data; and variably controlling an amount of data transmission of the output polygon object in accordance with a communication load status of a specified interface based on ISOBUS and a usage status of the virtual terminal, and transmitting data related to the output polygon object corresponding to the calculated vertices to the virtual terminal via a through the specified interface.

16. The method of claim 15, wherein the calculating operation includes:

sampling a specified number of points from an array of multiple distance values (ranges) included in the sensing data for a specified angular range within the effective measurement range, thereby calculating the output polygon vertices with a resolution lower than that of the array.

17. The method of claim 15, wherein the calculating operation includes:

calculating the polygon vertices based on a directional difference and an area ratio between the effective measurement range and the output polygon object to be positioned in a specified direction within the output polygon object.

18. The method of claim 15, wherein the calculating operation includes:

skipping or selecting the received sensing data based on a specified update rate, adjusting the update rate based on at least one condition of a usage status of the virtual terminal, a load on the specified interface, or a driving mode; and calculating the polygon vertices from the selected sensing data.

19. An agricultural or forestry equipment comprising:

the spatial information sensor apparatus of claim 1; and a virtual terminal connected to the spatial information sensor apparatus through the specified interface, and configured to display the object pool received from the spatial information sensor apparatus and to output the output polygon objects defined in the object pool.

20. The agricultural or forestry equipment of claim 19, further comprising:

an ECU (Engine Control Unit) for controlling an engine, wherein the ECU:

detects a safe area without surrounding object based on the sensing data from the sensor, and controls autonomous driving within the detected safe area.

* * * * *